(12) United States Patent
Andrial et al.

(10) Patent No.: US 9,815,257 B2
(45) Date of Patent: Nov. 14, 2017

(54) TRIM ASSEMBLY

(71) Applicant: Coach, Inc., New York, NY (US)

(72) Inventors: Raul H. Andrial, Maimi, FL (US); Farid S. Gadalla, College Point, NY (US)

(73) Assignee: Coach, Inc., New York, NY (US)

( * ) Notice: Subject to any disclaimer, the term of this patent is extended or adjusted under 35 U.S.C. 154(b) by 749 days.

(21) Appl. No.: 14/160,933

(22) Filed: Jan. 22, 2014

(65) Prior Publication Data

US 2015/0202840 A1    Jul. 23, 2015

(51) Int. Cl.
| | | |
|---|---|---|
| *B32B 7/12* | (2006.01) | |
| *B32B 9/02* | (2006.01) | |
| *B32B 37/12* | (2006.01) | |
| *A41D 27/08* | (2006.01) | |
| *B32B 38/10* | (2006.01) | |
| *A41F 9/00* | (2006.01) | |

(52) U.S. Cl.
CPC ............... *B32B 7/12* (2013.01); *A41D 27/08* (2013.01); *B32B 9/025* (2013.01); *A41F 9/002* (2013.01); *B32B 37/1207* (2013.01); *B32B 38/10* (2013.01); *B32B 2317/08* (2013.01); *B32B 2437/00* (2013.01); *Y10T 428/2495* (2015.01)

(58) Field of Classification Search
CPC ....... B32B 7/12; B32B 9/025; B32B 37/1207; B32B 2437/00; B32B 2317/08; B32B 38/10; A41D 27/08; A41F 9/002; Y10T 428/2495; Y10T 428/14; Y10T 428/1486
See application file for complete search history.

(56) References Cited

U.S. PATENT DOCUMENTS

| | | |
|---|---|---|
| 1,831,764 A | 11/1931 | Evans |
| 2,522,646 A | 9/1950 | Stritter |
| 3,547,753 A | 12/1970 | Sutton |
| | (Continued) | |

FOREIGN PATENT DOCUMENTS

CN    101743120 A    6/2010

OTHER PUBLICATIONS

International Search Report and Written Opinon for related PCT Application No. PCT/US2015/010585 dated Apr. 24, 2015.
(Continued)

*Primary Examiner* — Patricia L Nordmeyer
(74) *Attorney, Agent, or Firm* — Honigman Miller Schwartz and Cohn LLP (57) ABSTRACT

An assembly includes a substrate, a trim member and a heat-activated adhesive member. The substrate defines at least two surfaces including a finished surface and an unfinished surface. The trim member defines at least two surfaces including an outwardly-facing finished surface and an inwardly-facing attachment surface. The inwardly-facing attachment surface of the trim member is arranged over and trims the unfinished surface of the substrate. The finished surface of the substrate and the outwardly-facing surface of the trim member form a cooperating finished surface of the assembly. The heat-activated adhesive member is disposed over both of the unfinished surface and the inwardly-facing attachment surface of the trim member to indirectly attach the unfinished surface of the substrate to the inwardly-facing attachment surface of the trim member. A method is also disclosed.

11 Claims, 10 Drawing Sheets

(56) References Cited

U.S. PATENT DOCUMENTS

| | | | |
|---|---|---|---|
| 3,930,921 A | 1/1976 | Connett | |
| 3,993,526 A | 11/1976 | Off et al. | |
| 4,432,831 A | 2/1984 | Blicher | |
| 4,522,677 A | 6/1985 | Kuhn | |
| 5,820,719 A | 10/1998 | Strickland et al. | |
| 5,983,527 A | 11/1999 | Strickland et al. | |
| 7,935,215 B2 * | 5/2011 | Husemann | C09J 7/00 156/307.5 |
| 2013/0266775 A1 | 10/2013 | Kramer et al. | |

OTHER PUBLICATIONS

Chinese Office Action for the related application No. 201580005832.5 dated Apr. 28, 2017.

* cited by examiner

TRIM ASSEMBLY

TECHNICAL FIELD

This disclosure relates to an assembly having a trim member and methods for forming the same.

BACKGROUND

Trimmed goods typically include belts, straps, and other articles of clothing. Leather edges of those goods generally receive an application of liquid stain by hand and are laid to dry. Improvements to trimmed goods and methods for assembling the same are continuously being sought in order to advance the arts.

SUMMARY

One aspect of the disclosure provides an assembly including a substrate, a trim member and a heat-activated adhesive that indirectly attaches the substrate to the trim member.

Implementations of the disclosure may include one or more of the following features. In some implementations, the substrate defines at least two surfaces including a finished surface and an unfinished surface. The trim member defines at least two surfaces including an outwardly-facing finished surface and an inwardly-facing attachment surface. The inwardly-facing attachment surface of the trim member is arranged over and trims the unfinished surface of the substrate. The finished surface of the substrate and the outwardly-facing surface of the trim member form a cooperating finished surface. The heat-activated adhesive member is disposed over both of the unfinished surface and the inwardly-facing attachment surface to indirectly attach the unfinished surface of the substrate to the inwardly-facing attachment surface of the trim member.

Additionally, a height of the substrate ranges between approximately five-to-ten times a height of the trim member. The height of the substrate ranges between approximately two-to-four times a width of the trim member. The height of the substrate ranges between approximately two-to-four times a width of the adhesive member.

In some examples, both of the finished surface of the substrate and the outwardly-facing finished surface of the trim member define an A-surface. The unfinished surface of the substrate defines a B-surface. The A-surface is a show surface having an aesthetically-pleasing appearance. The B-surface is not a show surfacing having a non-aesthetically-pleasing appearance. At least one of the substrate and the trim member includes a leather material or an artificial leather material.

In some instances, the adhesive member defines at least two surfaces including a first attachment surface and a second attachment surface. The first attachment surface is attached to one of the unfinished surface of the substrate and the inwardly-facing attachment surface of the trim member. Prior to indirectly attaching the unfinished surface of the substrate to the inwardly-facing attachment surface of the trim member, the adhesive member further includes a removable member removably-connected to the second attachment surface.

In some examples, after removing the removable member from the second attachment surface of the adhesive member the second attachment surface of the adhesive member is attached to the other of the unfinished surface of the substrate and the inwardly-facing attachment surface of the trim member.

In some implementations, the removable member includes a film material. Alternatively, the removable member may include a paper material.

In some instances, the height of the substrate ranges between approximately two-to-four times a width of the substrate. The width of the trim member may range between approximately two-to-four times the height of the trim member. Moreover, the width of the adhesive member may range between approximately two-to-four times a height of the adhesive member.

Another aspect of the disclosure provides a method for forming an assembly that includes a plurality of components. The plurality of components includes a substrate, a trim member, and an adhesive member. A height of the substrate ranges between approximately five-to-ten times a height of the trim member. The height of the substrate ranges between approximately two-to-four times a width of the trim member. The height of the substrate ranges between approximately two-to-four times a width of the adhesive member. The adhesive member defines at least two surfaces including a first attachment surface and a second attachment surface. The adhesive member includes a removable member removably-connected to the second attachment surface. The method includes arranging the first attachment surface of the adhesive member adjacent one of an unfinished surface of the substrate and an inwardly-facing attachment surface of the trim member. The method also includes activating the adhesive member for securing the first attachment surface of the adhesive member to one of the unfinished surface of the substrate and the inwardly-facing attachment surface of the trim member. The method includes removing the removable member from the second attachment surface of the adhesive member and arranging the second attachment surface of the adhesive member adjacent the other of the unfinished surface of the substrate and the inwardly-facing attachment surface of the trim member for securing the second attachment surface of the adhesive member to the other of the unfinished surface of the substrate and the inwardly-facing attachment surface of the trim member.

Activating the adhesive member may include stimulating the adhesive member with a stimulus provided by a stimulator. In some instances, the stimulator may include a heat gun, and the stimulus may include heat.

In some examples, removing the removable member from the second attachment surface of the adhesive member includes peeling the removable member away from the second attachment surface of the adhesive member.

In still yet another aspect of the disclosure, a method includes providing a length of a substrate upon a first dispensing reel. The substrate includes a finished surface and an unfinished surface. The method also includes providing a length of an adhesive member upon a second dispensing reel. The adhesive member includes a first attachment surface and a second attachment surface. The adhesive member includes a removable member removably-connected to the second attachment surface. The method also includes providing a length of a trim member upon a third dispensing reel. The trim member includes an outwardly-facing finished surface and an inwardly-facing attachment surface. The method also includes sending a signal from a controller to an actuator to impart rotation of a first take-up reel and a second take-up reel for reeling the removable member that results in removing the removable member from the second attachment surface of the adhesive member and storing the removable member upon the first take-up reel. The method also includes reeling the substrate, the adhesive member and the trim member that results in dispensing the substrate from the first dispensing reel, dispensing the adhesive member from the second dispensing reel, dispensing the trim member from the third dispensing reel, connecting the substrate to the trim member by the adhesive member for forming an assembly and storing the assembly upon the second take-up reel.

In some examples, the method includes arranging the unfinished surface of the substrate adjacent the first attachment surface of the adhesive member by disposing the substrate and the adhesive member between a first pair of nip rollers. The method may include activating the adhesive member for: attaching the unfinished surface of the substrate arranged adjacent the first attachment surface of the adhesive member.

In some implementations, activating the adhesive member includes stimulating the adhesive member with a stimulus provided by a stimulator. The stimulator may include a heat gun, and the stimulus may include heat.

In some examples, the method includes arranging the inwardly-facing attachment surface of the trim member adjacent the second attachment surface of the adhesive member by disposing the substrate, the adhesive member, and the trim member between another pair of nip rollers.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2B' is an enlarged view according to line 2B' of FIG. 2B.

FIG. 4B' is an enlarged view according to line 4B' of FIG. 4B.

Like reference symbols in the various drawings indicate like elements.

DETAILED DESCRIPTION

An assembly may include a substrate, a trim member and an adhesive member. Upon joining the substrate and the trim member with the adhesive member, the trim member trims an unfinished surface of the substrate. One or both of the substrate and the trim member includes a leather material or an artificial leather material such that the assembly forms a leather good or an artificial leather good. The leather good or artificial leather good may include, but is not limited to, a belt, a strap (e.g., for a purse or satchel), a wallet, a handbag or the like.

Referring to FIGS. 1A-2D, in some implementations, an assembly 10 includes a first portion 12, a second portion 14 and a third portion 16 that joins the first portion 12 to the second portion 14. In some examples, the first portion 12 is a substrate. In some examples, the second portion 14 is a trim member. In some examples, the third portion 16 is an adhesive member.

Figure 1A:
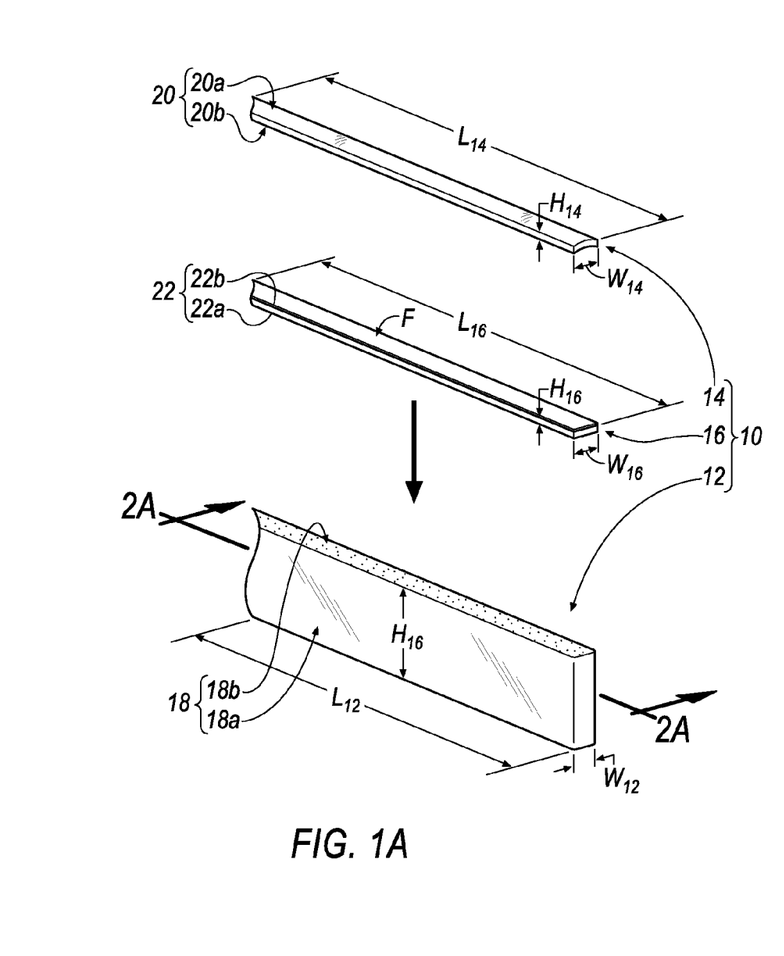
FIG. 1A is an exploded perspective view of an exemplary assembly.

Referring to FIG. 1A, the substrate 12 defines a length, $L_{12}$, a width, $W_{12}$, a height, $H_{12}$. In some implementations, the height, $H_{12}$, of the substrate 12 ranges between approximately two-to-four times the width, $W_{12}$, of the substrate 12.

The trim member 14 defines a length, $L_{14}$, a width, $W_{14}$, a height, $H_{14}$. In some implementations, the width, $W_{14}$, of the trim member 14 ranges between approximately two-to-four times the height, $H_{14}$, of the trim member 14.

The adhesive member 16 defines a length, $L_{16}$, a width, $W_{16}$, a height, $H_{16}$. In some implementations, the width, $W_{16}$, of the adhesive member 16 ranges between approximately two-to-four times the height, $H_{16}$, of the adhesive member 16.

In some implementations, the length, $L_{12}$, of the substrate 12 is approximately equal to the length, $L_{14}$, of the trim member 14 and the length, $L_{16}$, of the adhesive member 16. In some instances, the width, $W_{12}$, of the substrate 12 is approximately equal to the width, $W_{14}$, of the trim member 14 and the width, $W_{16}$, of the adhesive member 16.

In some examples, the height, $H_{12}$, of the substrate 12 ranges between approximately five-to-ten times the height, $H_{14}$, of the trim member 14 and the height, $H_{16}$, of the adhesive member 16. The height, $H_{12}$, of the substrate 12 may range between approximately two-to-four times the width, $W_{14}$, of the trim member 14. In some examples, the height, $H_{12}$, of the substrate 12 ranges between approximately two-to-four times the width, $W_{16}$, of the adhesive member 16.

The substrate 12 defines at least two surfaces 18 including a finished surface 18a and an unfinished surface 18b. Although two surfaces 18 are shown at FIG. 1A, the substrate 12 may include more than one finished surface 18a and more than one unfinished surface 18b.

Alternatively, the finished surface 18a may be described as an "A-surface" or a "show surface." The finished surface 18a is aesthetically pleasing to the eye. In some instances, the finished surface 18a includes one or more aesthetically-pleasing characteristics, such as, a smoothness, a glossiness or the like.

Alternatively, the unfinished surface 18b may be described as a "B-surface." In comparison to the finished surface 18a, the unfinished surface 18b is not aesthetically pleasing to the eye. In some examples, the unfinished surface 18b includes one or more non-aesthetically-pleasing characteristics, such as, a roughness, a dullness or the like.

The trim member 14 defines at least two surfaces 20 including an outwardly-facing finished surface 20a and an inwardly-facing attachment surface 20b. Like the finished surface 18a of the substrate 12, the outwardly-facing finished surface 20a of the trim member 14 may be described as an "A-surface" or a "show surface." The outwardly-facing finished surface 20a is aesthetically pleasing to the eye. In some examples, the outwardly-facing finished surface 20a includes one or more aesthetically-pleasing characteristics, such as, a smoothness, a glossiness or the like.

The adhesive member 16 defines at least two surfaces 22 including a first attachment surface 22a and a second attachment surface 22b. As seen in FIG. 1A, prior to forming the assembly 10, the first attachment surface 22a is exposed to atmosphere, and, the second attachment surface 22b is covered by a removable member, F. The removable member, F, includes, but is not limited to, film, paper, or the like. The removable member, F, is not a component of the assembly 10, and, as such, an operator or device discards the removable member, F (as seen in, e.g., FIGS. 1B and 2D), after the removable member, F, is selectively-removed from the second attachment surface 22b of the adhesive member 16 (as seen in, e.g., FIG. 2C).

Both of the first attachment surface 22a and the second attachment surface 22b of the adhesive member 16 may not immediately have a tacky or adhesive quality until being 'activated.' Activation of the tackiness or adhesive quality of the first attachment surface 22a and the second attachment surface 22b of the adhesive member 16 may occur in response to application of an external stimulus (as seen in, e.g., FIG. 2B) to the adhesive member 16. In some examples, an exemplary external stimulus includes heat; therefore, some implementations of a type of adhesive defining the adhesive member 16 includes a heat-activated adhesive.

Figure 2A:
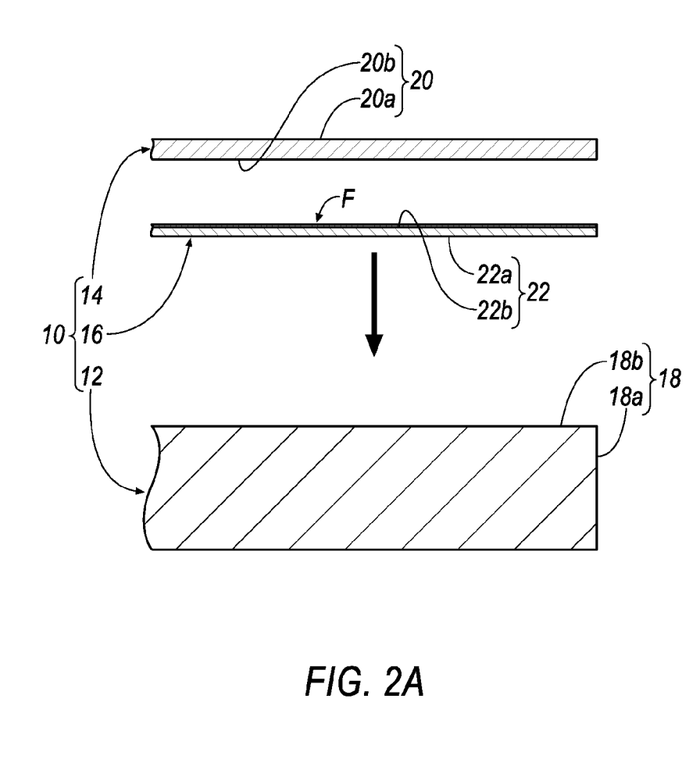
FIG. 2A is a cross-sectional view of the exemplary assembly according to line 2A-2A of FIG. 1A.
Figure 2B:
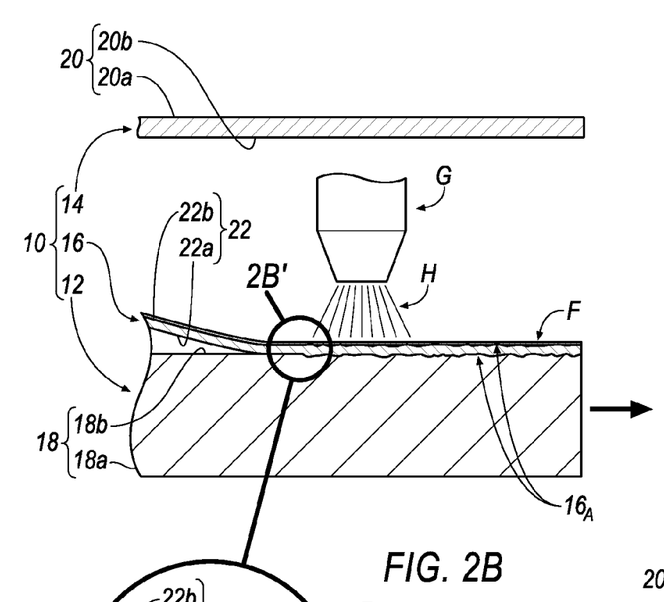
FIG. 2B is a cross-sectional view of a partially assembled assembly of FIG. 2A.

FIGS. 2A-2D illustrate an exemplary method for assembling the assembly 10. Firstly, as seen in FIG. 2A, an operator or device arranges the adhesive member 16 over the substrate 12 such that the first attachment surface 22a of the adhesive member 16 opposes the unfinished surface 18b of the substrate 12. Then, referring to FIG. 2B, prior to or after an operator or device disposes the first attachment surface 22a of the adhesive member 16 adjacent the unfinished surface 18b of the substrate 12, an external stimulus, H, activates $16_A$ (see, e.g., FIG. 2B') the tackiness or adhesive quality of the first attachment surface 22a and the second attachment surface 22b of the adhesive member 16. In some instances, the external stimulus, H, includes heat. In some examples, a stimulator, G, emits the heat, H. In some implementations, the stimulator, G, is a heat gun. As a result of activating $16_A$ the adhesive member 16 with the external stimulus, H, the tackiness or adhesive quality of the first attachment surface 22a secures the adhesive member 16 to the unfinished surface 18b of the substrate 12.

Figure 1B:
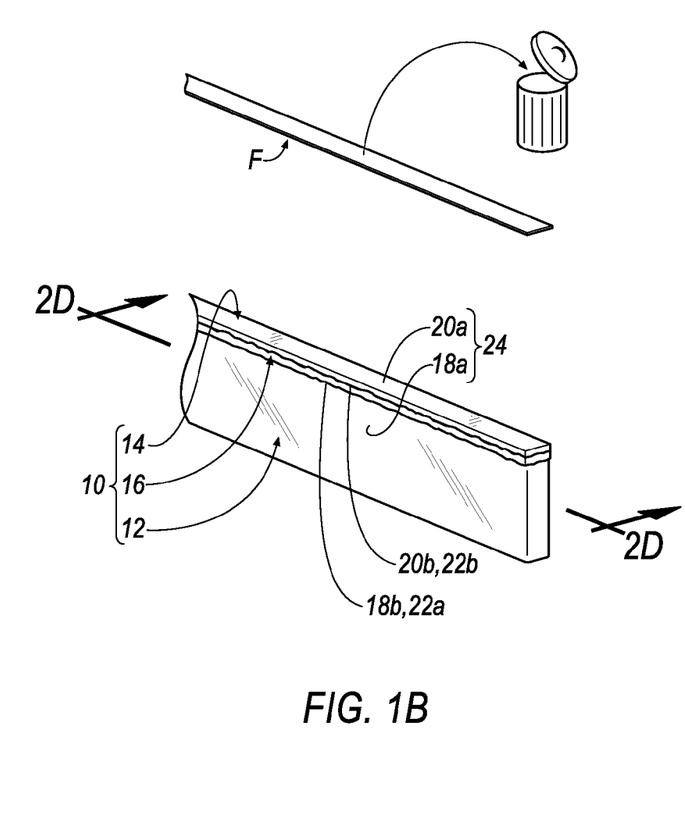
FIG. 1B is an assembled perspective view of the assembly of FIG. 1A.
Figure 2C:
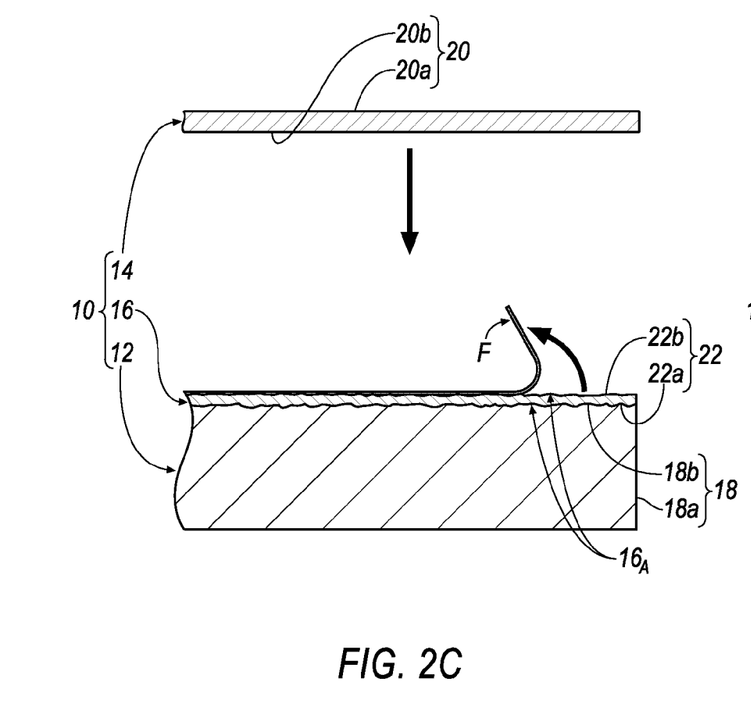
FIG. 2C is another cross-sectional view of the assembly of FIG. 2B in a partially assembled orientation.
Figure 2D:
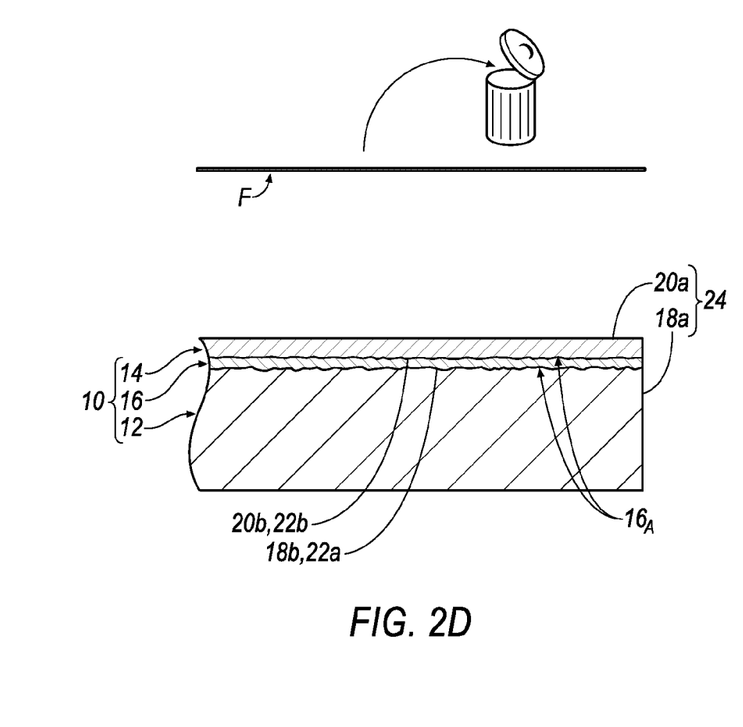
FIG. 2D is a cross-sectional view of the exemplary assembly according to line 2D-2D of FIG. 1B.

Referring to FIG. 2C, after securing the adhesive member 16 to the unfinished surface 18b of the substrate 12, an operator or device removes the removable member, F, from the second attachment surface 22b of the adhesive member 16. The act of removing the removable member, F, from the second attachment surface 22b of the adhesive member 16 may include peeling the removable member, F, away from the second attachment surface 22b of the adhesive member 16. Then, upon removal of the removable member, F, from the second attachment surface 22b of the adhesive member 16, an operator or device arranges the inwardly-facing attachment surface 20b of the trim member 14 adjacent the activated $16_A$ second attachment surface 22b of the adhesive member 16 for securing the trim member 14 to the adhesive member 16 as seen in FIGS. 1B and 2D.

Once the trim member 14 is secured to the adhesive member 16, the adhesive member 16 indirectly attaches the inwardly-facing attachment surface 20b of the trim member 14 to the unfinished surface 18b of the substrate 12 by way of the adhesive member 16. Functionally, attachment of the trim member 14 to the substrate 12 results in the trim member 14 trimming the substrate 12. The act of trimming in the present disclosure may be defined by arranging a first member (e.g., the trim member 14) relative a second member (e.g., the substrate 12) for the purpose of decorating, at least partially covering or at least partially obstructing from sight a surface portion (e.g., the unfinished surface 18b) of the second member.

As a result of the trim member 14 decorating, at least partially covering or at least partially obstructing from sight the unfinished surface 18b of the substrate 12, the outer surfaces (e.g., the finished surface 18a of the substrate 12 and the outwardly-facing finished surface 20a of the trim member 14) form a cooperating finished surface 24 (see, e.g., FIGS. 1B and 2D) of the assembly 10 that is aesthetically pleasing to the eye. Alternatively, the cooperating finished surface 24 may be described as a cooperating "A-surface" or a cooperating "show surface."

One or both of the substrate 12 and the trim member 14 includes a leather material or an artificial leather material such that the assembly 10 forms a leather good or an artificial leather good. The leather good 10 or artificial leather good 10 may include, but is not limited to: a belt, a strap (e.g., for a purse or satchel), a wallet, a handbag or the like.

Referring to FIGS. 3A-4D, in some implementations, an assembly 10' includes a first portion 12', a second portion 14' and a third portion 16' that joins the first portion 12' to the second portion 14'. In some examples, the first portion 12' is a substrate, the second portion 14' is a trim member, and the third portion 16' is an adhesive member.

Figure 3A:
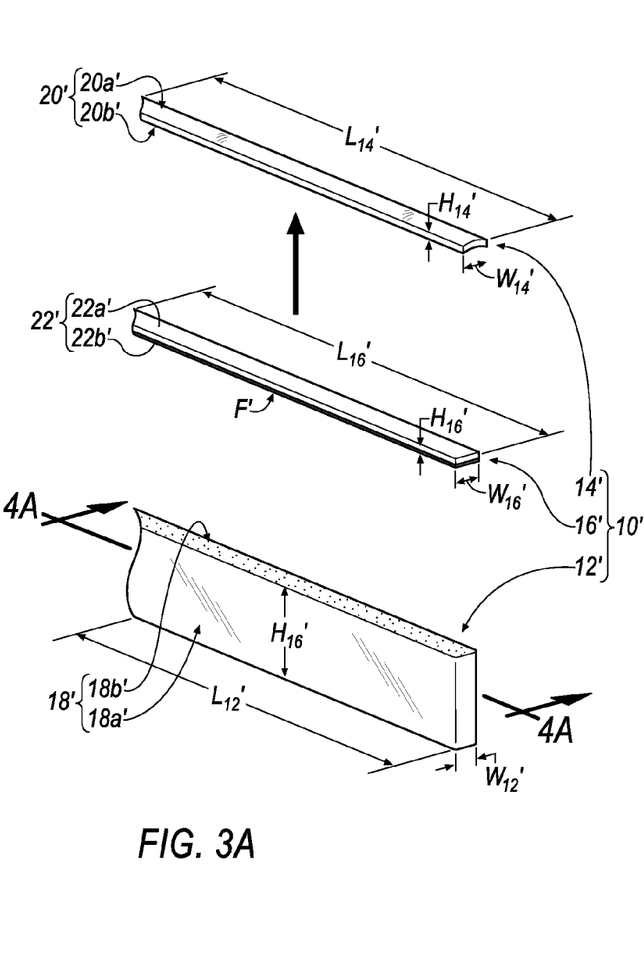
FIG. 3A is an exploded perspective view of an exemplary assembly.

Referring to FIG. 3A, the substrate 12' defines a length, $L_{12}'$, a width, $W_{12}'$, a height, $H_{12}'$. In some implementations, the height, $H_{12}'$, of the substrate 12' ranges between approximately two-to-four times the width, $W_{12}'$, of the substrate 12'.

The trim member 14' defines a length, $L_{14}'$, a width, $W_{14}'$, a height, $H_{14}'$. In some implementations, the width, $W_{14}'$, of the trim member 14' ranges between approximately two-to-four times the height, $H_{14}'$, of the trim member 14'.

The adhesive member 16' defines a length, $L_{16}'$, a width, $W_{16}'$, a height, $H_{16}'$. In some implementations, the width, $W_{16}'$, of the adhesive member 16' ranges between approximately two-to-four times the height, $H_{16}'$, of the adhesive member 16'.

The length, $L_{12}'$, of the substrate 12' may approximately equal the length, $L_{14}'$, of the trim member 14' and the length, $L_{16}'$, of the adhesive member 16'. In some instances, the width, $W_{12}'$, of the substrate 12' is approximately equal to the width, $W_{14}'$, of the trim member 14' and the width, $W_{16}'$, of the adhesive member 16'. Moreover, the height, $H_{12}'$, of the substrate 12' may range between approximately five-to-ten times the height, $H_{14}'$, of the trim member 14' and the height, $H_{16}'$, of the adhesive member 16'. In some implementations, the height, $H_{12}'$, of the substrate 12' ranges between approximately two-to-four times the width, $W_{14}'$, of the trim member 14'. In some examples, the height, $H_{12}'$, of the substrate 12' ranges between approximately two-to-four times the width, $W_{16}'$, of the adhesive member 16'.

The substrate 12' defines at least two surfaces 18' including a finished surface 18a' and an unfinished surface 18b'. Although one finished surface 18a' and one unfinished surface 18b' are shown at FIG. 3A, the substrate 12' may include more than one finished surface 18a' and more than one unfinished surface 18b'.

Alternatively, the finished surface 18a' may be described as an "A-surface" or a "show surface." The finished surface 18a' is aesthetically pleasing to the eye. In some examples, the finished surface 18a' includes one or more aesthetically-pleasing characteristics, such as, a smoothness, a glossiness or the like.

Alternatively, the unfinished surface 18b' may be described as a "B-surface." In comparison to the finished surface 18a', the unfinished surface 18b' is not aesthetically pleasing to the eye. In some instances, the unfinished surface 18b' includes one or more non-aesthetically-pleasing characteristics, such as, a roughness, a dullness or the like.

The trim member 14' defines at least two surfaces 20' including an outwardly-facing finished surface 20a' and an inwardly-facing attachment surface 20b'. Like the finished surface 18a' of the substrate 12', the outwardly-facing finished surface 20a' of the trim member 14' may be described as an "A-surface" or a "show surface." The outwardly-facing finished surface 20a' is aesthetically pleasing to the eye. In some examples, the outwardly-facing finished surface 20a' includes one or more aesthetically-pleasing characteristics, such as, a smoothness, a glossiness or the like.

The adhesive member 16' defines at least two surfaces 22' including a first attachment surface 22a' and a second attachment surface 22b'. Prior to forming the assembly 10', the first attachment surface 22a' is exposed to atmosphere, and, the second attachment surface 22b' is covered by a removable member, F'. In some examples, the removable member, F', includes film, paper, or the like. The removable member, F', is not a component of the assembly 10', and, as such, an operator or device may discard the removable member, F' (as seen in, e.g., FIGS. 3B and 4D), after the operator or device selectively-removes the removable member, F' from the second attachment surface 22b' of the adhesive member 16' (as seen in e.g., FIG. 4C).

Both of the first attachment surface 22a' and the second attachment surface 22b' of the adhesive member 16' may not immediately be defined as having a tacky or adhesive quality for the purpose of securing a first member (e.g., the trim member 14') to a second member (e.g., the substrate 12') until being 'activated.' In some implementations, activation of the tackiness or adhesive quality of the first attachment surface 22a' and the second attachment surface 22b' of the adhesive member 16' occurs in response to application of an external stimulus (see, e.g., FIG. 4B) to the adhesive member 16'. An exemplary external stimulus includes heat; therefore, some implementations of a type of adhesive defining the adhesive member 16' includes a heat-activated adhesive.

Figure 4A:
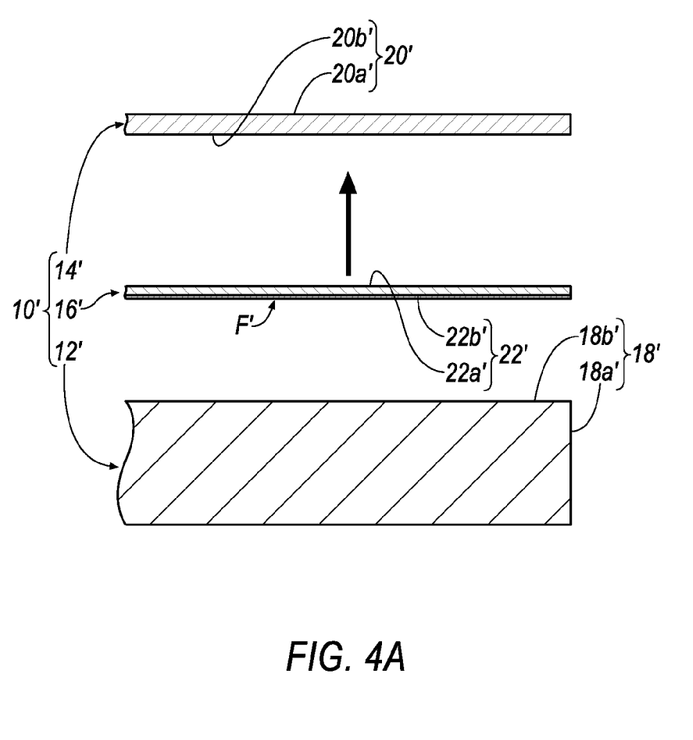
FIG. 4A is a cross-sectional view of the exemplary assembly according to line 4A-4A of FIG. 3.

Referring to FIGS. 4A-4D, an exemplary method for assembling the assembly 10, is shown. Firstly, as seen in FIG. 4A, an operator or device arranges the adhesive member 16' over the trim member 14' such that the first attachment surface 22a' of the adhesive member 16' opposes the inwardly-facing attachment surface 20b' of the trim member 14'.

Figure 4B:
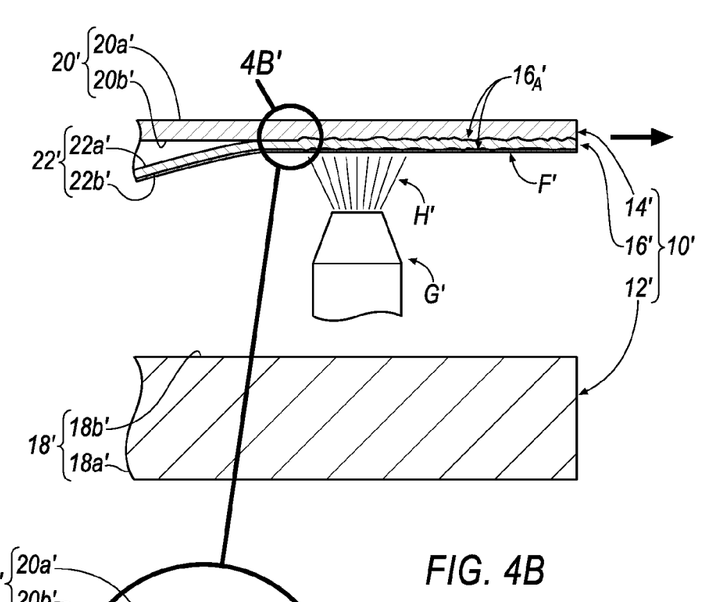
FIG. 4B is a cross-sectional view of a partially assembled assembly of FIG. 4A.

Referring to FIG. 4B, prior to or after an operator or device disposes the first attachment surface 22a' of the adhesive member 16' adjacent the inwardly-facing attachment surface 20b' of the trim member 14', an external stimulus, H', activates $16_A'$ (see, e.g., FIG. 4B') the tackiness or adhesive quality of the first attachment surface 22a' and the second attachment surface 22b' of the adhesive member 16'. In some instances, the external stimulus, H', includes heat. In some examples, a stimulator, G', emits the heat, H'. In some implementations, the stimulator, G', is a heat gun. As a result of activating $16_A'$ the adhesive member 16' with the external stimulus, H', the tackiness or adhesive quality of the first attachment surface 22a' secures the adhesive member 16' to the inwardly-facing attachment surface 20b' of the trim member 14'.

Figure 3B:
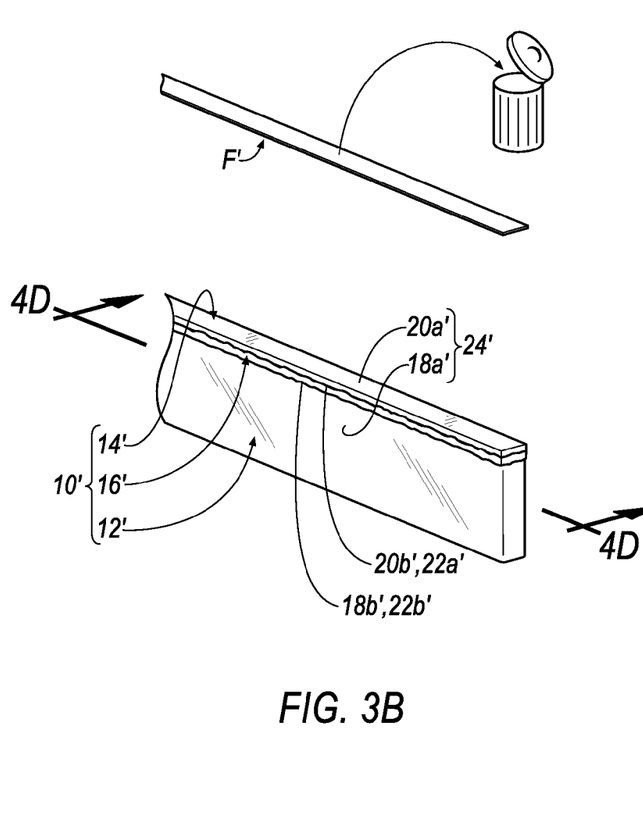
FIG. 3B is an assembled perspective view of the assembly of FIG. 3A.
Figure 4C:
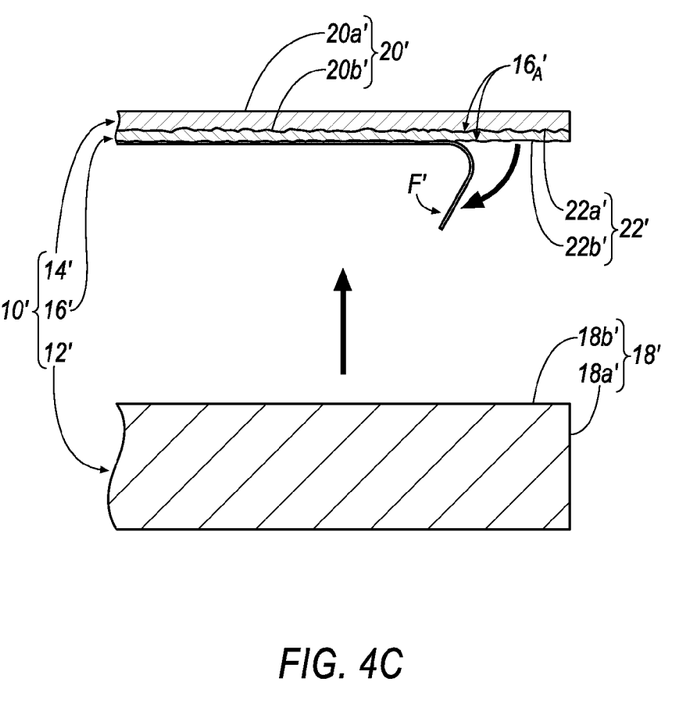
FIG. 4C is another cross-sectional view of the assembly of FIG. 4B in a partially assembled orientation.
Figure 4D:
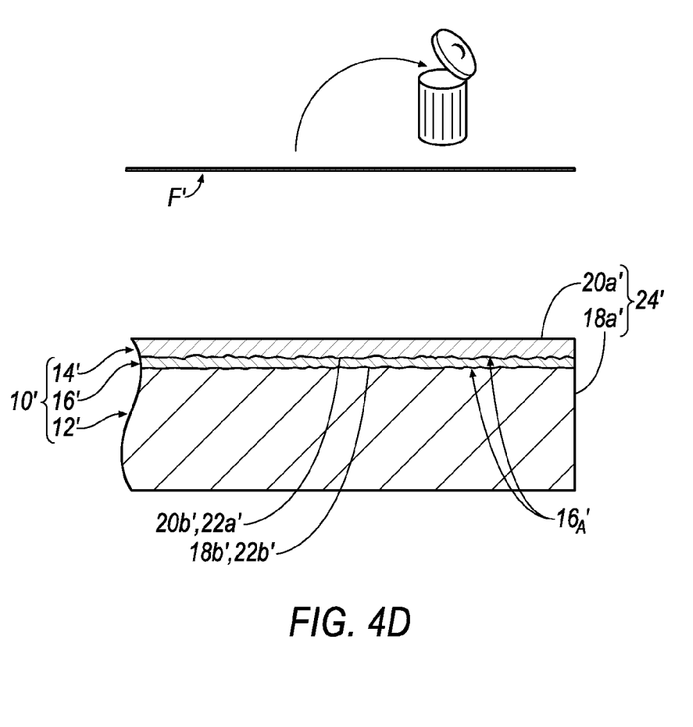
FIG. 4D is a cross-sectional view of the exemplary assembly according to line 4D-4D of FIG. 3B.

Referring to FIG. 4C, after the securing the adhesive member 16' to the inwardly-facing attachment surface 20b' of the trim member 14', an operator or device removes the removable member, F', from the second attachment surface 22b' of the adhesive member 16'. The act of removing the removable member, F', from the second attachment surface 22b' of the adhesive member 16' may include peeling the removable member, F', away from the second attachment surface 22b' of the adhesive member 16'. Then, upon removal of the removable member, F', from the second attachment surface 22b' of the adhesive member 16', an operator or device disposes the unfinished surface 18b' of the substrate 12' adjacent the activated $16_A'$ second attachment surface 22b' of the adhesive member 16' for securing the substrate 12' to the adhesive member 16' as seen in FIGS. 3B and 4D.

Once the substrate 12' is secured to the adhesive member 16', the adhesive member 16' indirectly attaches the inwardly-facing attachment surface 20b' of the trim member 14' to the unfinished surface 18b' of the substrate 12'. Functionally, attachment of the trim member 14' to the substrate 12' results in the trim member 14' trimming the substrate 12'. The act of trimming in the present disclosure may be defined by arranging a first member (e.g., the trim member 14') relative a second member (e.g., the substrate 12') for the purpose of decorating, at least partially covering or at least partially obstructing from sight a surface portion (e.g., the unfinished surface 18b') of the second member.

As a result of the trim member 14' decorating, at least partially covering or at least partially obstructing from sight the unfinished surface 18b' of the substrate 12', the outer surfaces (e.g., the finished surface 18a' of the substrate 12' and the outwardly-facing finished surface 20a' of the trim member 14') form a cooperating finished surface 24' (see, e.g., FIGS. 3B and 4D) of the assembly 10' that is aesthetically pleasing to the eye. Alternatively, the cooperating finished surface 24' may be described as a cooperating "A-surface" or a cooperating "show surface."

One or both of the substrate 12' and the trim member 14' includes a leather material or an artificial leather material such that the assembly 10' forms a leather good or an artificial leather good. The leather good 10' or artificial leather good 10' may include, but is not limited to: a belt, a strap (e.g., for a purse or satchel), a wallet, a handbag or the like.

Figure 5A:
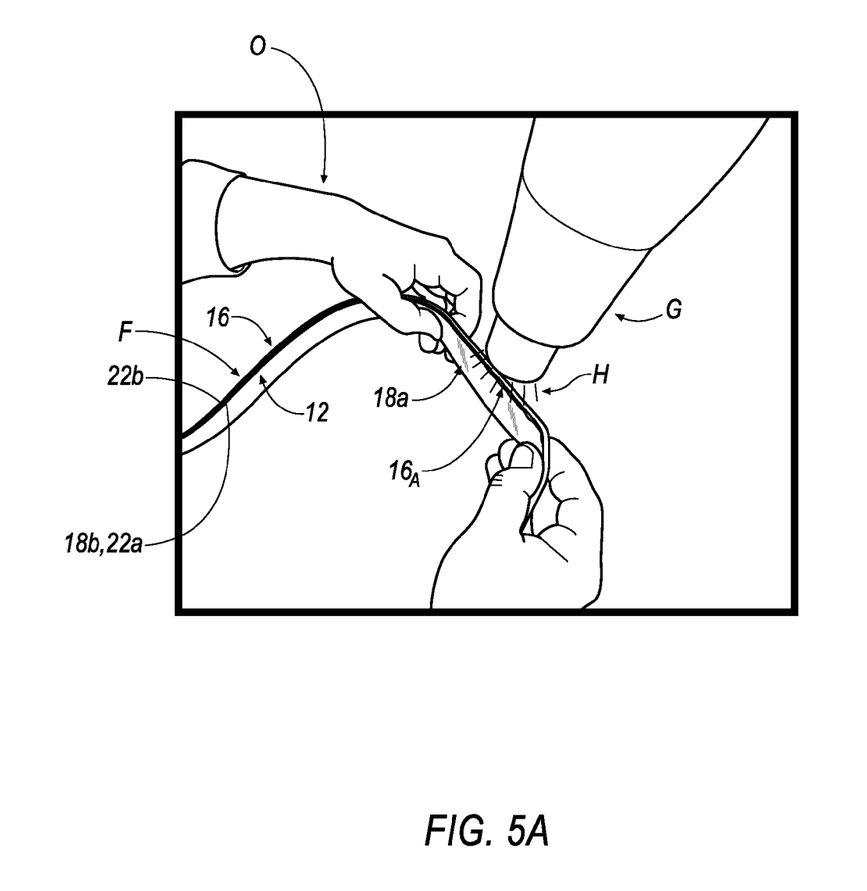
FIGS. 5A-5C illustrate a plurality of views of an exemplary method for assembling the assembly of FIG. 1A-2D or 3A-4D.
Figure 5B:
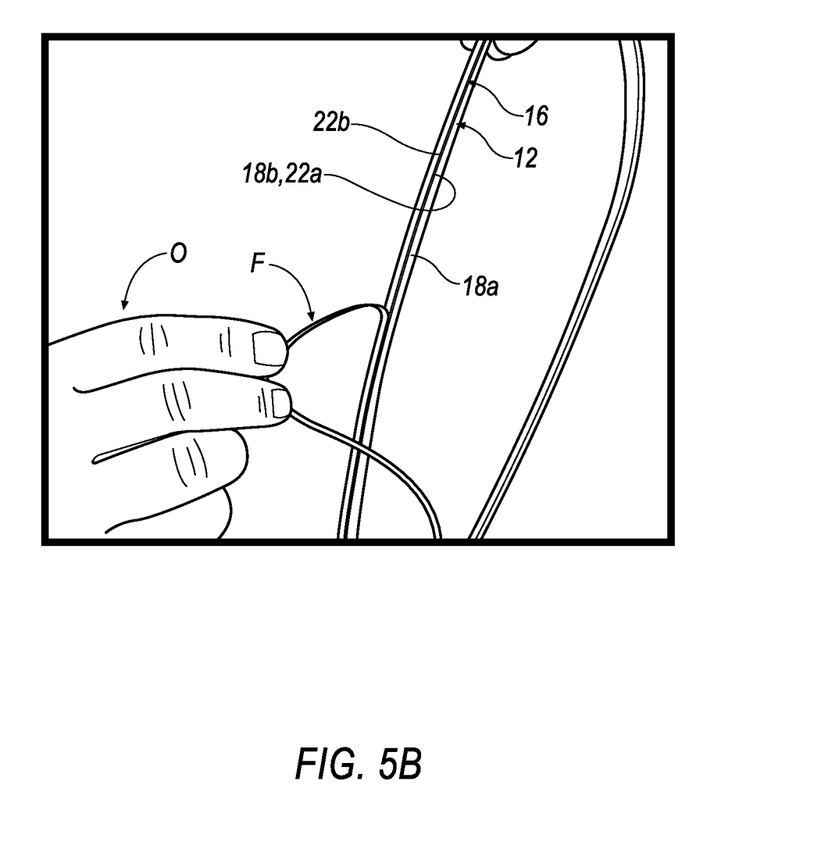
Figure 5C:
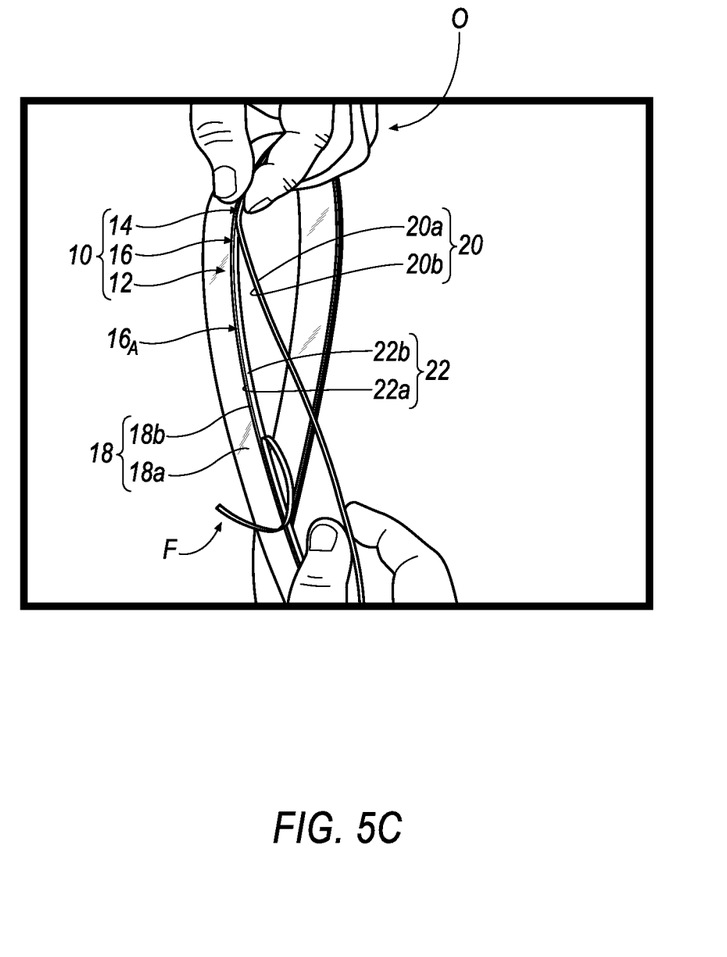

FIGS. 5A-5C illustrates an exemplary method for assembling the assembly 10. Firstly, as seen in FIG. 5A, an operator, O, may manually arrange the adhesive member 16 over the substrate 12 such that the first attachment surface 22a of the adhesive member 16 opposes the unfinished surface 18b of the substrate 12. Then, prior to or after the operator, O, manually disposes the first attachment surface 22a of the adhesive member 16 adjacent the unfinished surface 18b of the substrate 12, an external stimulus, H, activates $16_A$ the tackiness or adhesive quality of the first attachment surface 22a and the second attachment surface 22b of the adhesive member 16. As a result of activating $16_A$ the adhesive member 16 with the external stimulus, H, the tackiness or adhesive quality of the first attachment surface 22a secures the adhesive member 16 to the unfinished surface 18b of the substrate 12.

In some instances, the external stimulus, H, includes heat. In some examples, a stimulator, G, emits the heat, H. In some implementations, the stimulator, G, is a heat gun.

Referring to FIG. 5B, after manually securing the adhesive member 16 to the unfinished surface 18b of the substrate 12, the operator, O, manually removes the removable member, F, from the second attachment surface 22b of the adhesive member 16. Then, referring to FIG. 5C, upon manually removing the removable member, F, from the second attachment surface 22b of the adhesive member 16, the operator, O, disposes the inwardly-facing attachment surface 20b of the trim member 14 adjacent the activated $16_A$ second attachment surface 22b of the adhesive member 16 for securing the trim member 14 to the adhesive member 16. Once the trim member 14 is secured to the adhesive member 16, the adhesive member 16 indirectly attaches the inwardly-facing attachment surface 20b of the trim member 14 to the unfinished surface 18b of the substrate 12 by way of the adhesive member 16 to thereby form the assembly 10.

Although an exemplary method is shown at FIGS. 5A-5C whereby an operator, O, disposes the first attachment surface 22a of the adhesive member 16 adjacent the unfinished surface 18b of the substrate 12, the exemplary methodology is not limited to what is shown and described at FIGS. 5A-5C. For example, an exemplary methodology may be carried out for assembling the assembly 10' whereby the operator, O, disposes the first attachment surface 22a of the adhesive member 16 adjacent the inwardly-facing attachment surface 20b of the trim member 14.

Figure 6:
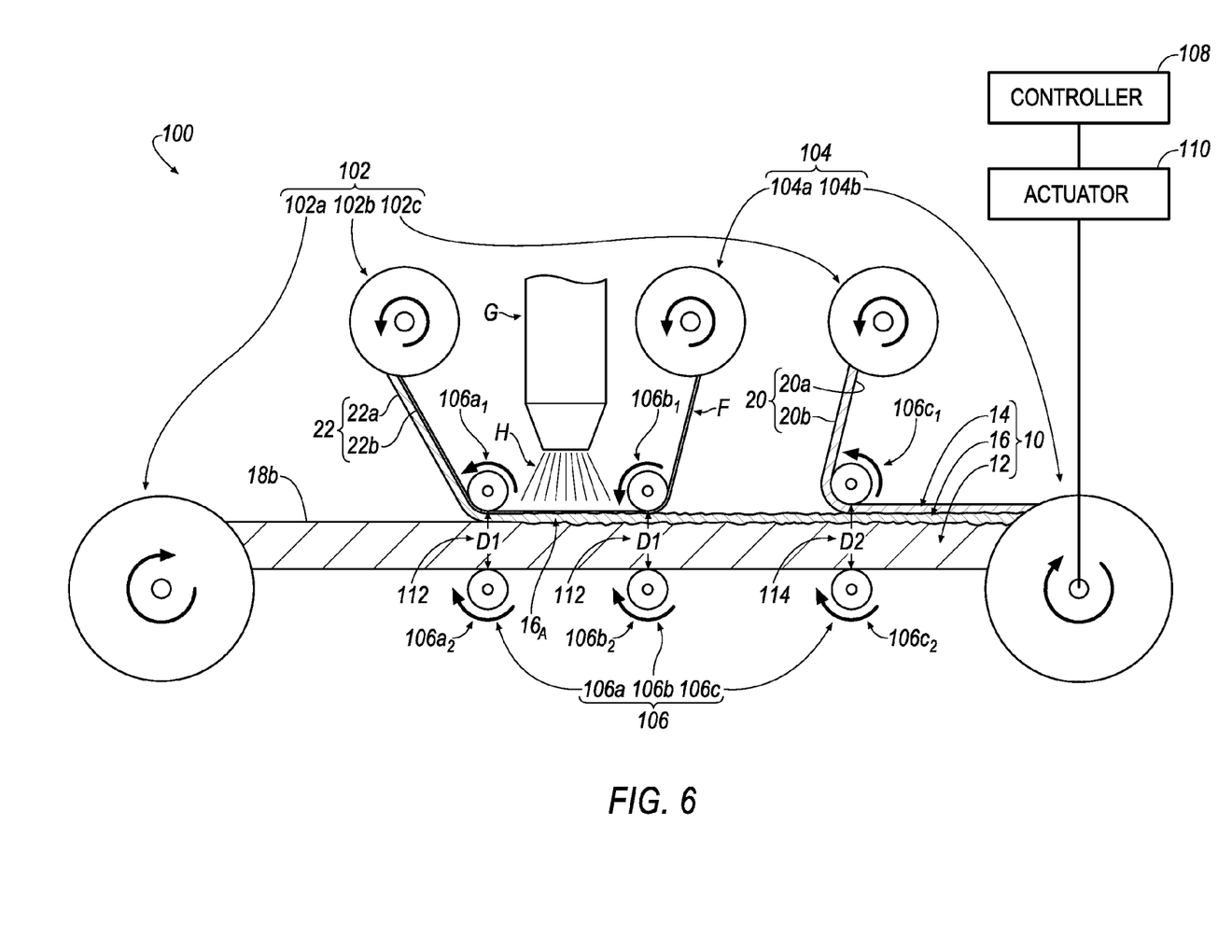
FIG. 6 illustrates a side view of a device that performs an exemplary method for assembling the assembly of FIG. 1A-2D or 3A-4D.

Referring to FIG. 6, an exemplary device 100 for assembling the assembly 10 is disclosed. In some implementations, the device 100 includes: a plurality material dispensing reels 102, a plurality of take-up reels 104 and a plurality of pairs of nip rollers 106. In some instances, the device further includes a stimulator, G. In some examples, the device 100 also includes a controller 108 that is communicatively connected to an actuator 110. Although not shown at FIG. 6, the device 100 may include a housing that supports and is connected to one or more of the plurality material dispensing reels 102, the plurality of take-up reels 104, the plurality of pairs of nip rollers 106, the controller 108, the actuator 110 and the stimulator, G. In some examples, a plurality of axles are fixed to one or more surfaces of the housing for rotatably-supporting the plurality material dispensing reels 102, the plurality of take-up reels 104 and the plurality of pairs of nip rollers 106. In some instances, the actuator 110 is connected to one or more of the plurality of axles for actively rotating one or more of the plurality material dispensing reels 102, the plurality of take-up reels 104 and the plurality of pairs of nip rollers 106.

The controller 108 may include a data processing device in communication with non-transitory memory that may store instructions executable on the data processor. The instructions, when executed, may cause the controller 108 to operate the assembling device 100. The actuator 110 may include a motor.

In some examples, the plurality of dispensing reels 102 includes a first dispensing reel 102a, a second dispensing reel 102b, and a third dispensing reel 102c. The first dispensing reel 102a dispenses a length of the substrate 12. The second dispensing reel 102b dispenses a length of the adhesive member 16 and the removable member, F (the second attachment surface 22b of the length of adhesive member 16 dispensed by the second dispensing reel 102b is covered by the removable member, F). The third dispensing reel 102c dispenses a length of the trim member 14.

In some instances, the plurality of take-up reels 104 includes a first take-up reel 104a and a second take-up reel 104b. The first take-up reel 104a receives the length of the removable member, F, that is separated from the second attachment surface 22b of the length of adhesive member 16. The second take-up reel 104b receives the assembly 10 that includes the substrate 12 joined to the trim member 14 by the adhesive member 16.

In some implementations, the plurality of pairs of nip rollers 106 includes a first pair of nip rollers 106a, a second pair of nip rollers 106b and a third pair of nip rollers 106c. The plurality of pairs of nip rollers 106 are arranged between the first dispensing reel 102a and the second take-up reel 104b.

The device 100 executes an exemplary methodology for assembling the assembly 10. Unlike the exemplary embodiment described above at FIGS. 5A-5C, which executes an exemplary manual (e.g., "by hand") methodology, the controller 108 allows an automated methodology for assembling the assembly 10. For example, the actuator 110 receives a signal from the controller 108 for rotating or ceasing rotation of one or more of the plurality of the dispensing reels 102 and the plurality of take-up reels 104. In some instances, after receiving a rotation signal from the controller 108, the actuator 110 imparts active rotation of at least one take-up reel 104a, 104b of the plurality of the take-up reels 104 such that at least one take-up reel 104a, 104b of the plurality of the take-up reels 104 behaves as a master (in a master-slave relationship) with respect to the plurality of dispensing reels 102 and the plurality of pairs of nip rollers 106 (i.e., the actuator 110 may not impart active rotation of the plurality of dispensing reels 102 and the plurality of pairs of nip rollers 106 such that the plurality of dispensing reels 102 and the plurality of nip rollers 106 passively rotates and therefore behave as slaves (in a master-slave relationship) as the device 100 forms the assembly 10). In some examples, after receiving a rotation signal from the controller 108, the actuator 110 imparts active rotation to both of the first take-up reel 104a and the second take-up reel 104b such that the first take-up reel 104a and the second take-up reel 104b behave as masters (in a master-slave relationship) with respect to the plurality of dispensing reels 102 and the plurality of pairs of nip rollers 106 (i.e., the actuator 110 may not impart active rotation to the plurality of dispensing reels 102 and the plurality of pairs of nip rollers 106 such that the plurality of dispensing reels 102 and the plurality of nip rollers 106 passively rotate and therefore behave as slaves (in a master-slave relationship) as the device 100 forms the assembly 10).

Passive or active rotation of the first dispensing reel 102a results in dispensing of the substrate 12 away from the first dispensing reel 102a in a direction toward the first pair of nip rollers 106a for arranging the substrate 12 between an upper nip roller $106a_1$ and a lower nip roller $106a_2$ of the first pair of nip rollers 106a. Passive or active rotation of the second dispensing reel 102b results in dispensing the adhesive member 16 and the removable member, F, away from the second dispensing reel 102b in a direction toward the first pair of nip rollers 106a for arranging the adhesive member 16 and the removable member, F, between the upper nip roller $106a_1$ and the lower nip roller $106a_2$ of the first pair of nip rollers 106a. Once the substrate 12, the adhesive member 16 and the removable member, F, are arranged between the upper nip roller $106a_1$ and a lower nip roller $106a_2$ of the first pair of nip rollers $106a$, the upper nip roller $106a_1$ of the first pair of nip rollers $106a$ contacts the removable member, F, and the lower nip roller $106a_2$ of the first pair of nip rollers $106a$ contacts the substrate 12.

The upper nip rollers $106a_1$, $106b_1$ and the lower nip roller $106a_2$, $106b_2$ of the first and second pairs of nip rollers $106a$, $106b$ are arranged in a spaced-apart relationship at a predetermined distance, D1, defining a gap or spacing 112 between the upper nip rollers $106a_1$, $106b_1$ and the lower nip rollers $106a_2$, $106b_2$ of the first and second pairs of nip rollers $106a$, $106b$, respectively. In some examples, the predetermined distance, D1, is approximately equal to a combined thickness of: the substrate 12, the adhesive member 16 and the removable member, F, in order to arrange the first attachment surface 22a of the adhesive member 16 in an opposing relationship with respect to the unfinished surface 18b of the substrate 12.

Passive or active rotation of the upper nip rollers $106a_1$ and the lower nip roller $106a_2$ of the first pair of nip rollers $106a$ results in advancement of: the substrate 12, the adhesive member 16 and the removable member, F, in a direction toward the second pair of nip rollers $106b$ for arranging the substrate 12, the adhesive member 16 and the removable member, F, between an upper nip roller $106b_1$ and a lower nip roller $106b_2$ of the second pair of nip rollers $106b$. As the substrate 12, the adhesive member 16 and the removable member, F, are advanced away from the upper nip roller $106a_1$ and the lower nip roller $106a_2$ of the first pair of nip rollers $106a$, the substrate 12, the adhesive member 16 and the removable member, F, are advanced under the stimulator, G. The stimulator, G, applies an external stimulus, H, to the substrate 12, the adhesive member 16 and the removable member, F, for activating $16_A$ the tackiness or adhesive quality of the first attachment surface 22a and the second attachment surface 22b of the adhesive member 16. As a result of activating $16_A$ the adhesive member 16 with the external stimulus, H, the tackiness or adhesive quality of the first attachment surface 22a secures the adhesive member 16 to the unfinished surface 18b of the substrate 12.

In some instances, the external stimulus, H, includes heat. In some examples, the stimulator, G, emits the heat, H. In some implementations, the stimulator, G, is a heat gun.

Passive or active rotation of the upper nip roller $106b_1$ and the lower nip roller $106b_2$ of the second pair of nip rollers $106b$ results in advancement of the substrate 12, the adhesive member 16, and the removable member, F, in a direction toward the third pair of nip rollers $106c$ for arranging the substrate 12 and the adhesive member 16 (without the removable member, F, attached to the adhesive member 16) between an upper nip roller $106c_1$ and a lower nip roller $106c_2$ of the third pair of nip rollers $106c$. Prior to advancing the substrate 12 and the adhesive member 16 away from the upper nip roller $106c_1$ and the lower nip roller $106c_2$ of the third pair of nip rollers $106c$, the removable member, F, is guided away from the second attachment surface 22b of the adhesive member 16 and being tensioned about a portion of a surface of the upper nip roller $106b_1$ of the second pair of nip rollers $106b$ in a direction toward the first take-up reel $104a$ of the plurality of take-up reels $104$. The first take-up reel $104a$ stores the length of the removable member, F, that is removed from the second attachment surface 22b of the adhesive member 16. The removable member, F, that is stored upon the first take-up reel $104a$ may be subsequently discarded.

In some instances, the first take-up reel $104a$ is actively rotated as a master (in a master-slave relationship) in order to assist in pulling the substrate 12, the adhesive member 16 and the removable member, F, through the spacing 112 between the upper nip rollers $106a_1$, $106b_1$ and the lower nip roller $106a_2$, $106b_2$ of the first and second pairs of nip rollers $106a$, $106b$, respectively. In some instances, the predetermined distance, D1, defining the spacing 112 between the upper nip roller $106b_1$ and the lower nip roller $106b_2$ of the second pair of nip rollers $106b$ is approximately equal to but slightly less than the combined thickness of: the substrate 12, the adhesive member 16 and the removable member, F, in order to slightly pinch the combined thickness of the substrate 12, the adhesive member 16 and the removable member, F, in order to arrange the activated $16_A$ first attachment surface 22a of the adhesive member 16 adjacent the unfinished surface 18b of the substrate 12 for securing the adhesive member 16 to the unfinished surface 18b of the substrate 12.

Prior to advancing the substrate 12 and the adhesive member 16 though a predetermined distance, D2, defining a gap or spacing 114 between the upper nip rollers $106c_1$ and the lower nip rollers $106c_2$ of the third pair of nip rollers $106c$, passive or active rotation of the third dispensing reel $102c$ results in dispensing of the trim member 14 away from the third dispensing reel $102c$ in a direction toward the second take-up reel $104b$ for arranging the substrate 12, the adhesive member 16 and the trim member 14 between the upper nip roller $106c_1$ and the lower nip roller $106c_2$ of the third pair of nip rollers $106c$. Passive or active rotation of the upper nip roller $106c_1$ and the lower nip roller $106c_2$ of the third pair of nip rollers $106c$ results in advancement of: the substrate 12, the adhesive member 16 and the trim member 14 in a direction toward the second take-up reel $104b$.

In some instances, the second take-up reel $104b$ is actively rotated as a master (in a master-slave relationship) in order to assist in pulling the substrate 12, the adhesive member 16 and the trim member 114 through the spacing 114 between the upper nip roller $106c_1$ and the lower nip roller $106c_2$ of the third pair of nip rollers $106c$. Further, in some examples, active rotation of the second take-up reel $104b$ as a master (in a master-slave relationship) results in the trim member 14 being pulled away from third dispensing reel $102c$ and being tensioned about a portion of a surface of the upper nip roller $106c_1$ of the third pair of nip rollers $106c$. In some instances, the predetermined distance, D2, defining the spacing 114 between the upper nip roller $106c_1$ and the lower nip roller $106c_2$ of the second pair of nip rollers $106b$ is approximately equal to but slightly less than the combined thickness of: the substrate 12, the adhesive member 16 and the trim member 14 in order to slightly pinch the combined thickness of the substrate 12, the adhesive member 16 and the removable member, F, in order to arrange the activated $16_A$ second attachment surface 22b of the adhesive member 16 adjacent the inwardly-facing attachment surface 20b of the trim member 14 for securing the adhesive member 16 to the inwardly-facing attachment surface 20b of the substrate 12.

The first take-up reel $104a$ stores the length of the assembled assembly 10. The assembly includes the trim member 14 attached to the substrate 12 by way of the adhesive member 16.

Although an exemplary method is shown at FIG. 6 whereby the device 100 arranges the first attachment surface 22a of the adhesive member 16 adjacent the unfinished surface 18b of the substrate 12, the exemplary methodology is not limited to what is shown and described at FIG. 6. For example, an exemplary methodology may be carried out for assembling the assembly 10' whereby the device 100 disposes the first attachment surface 22a of the adhesive member 16 adjacent the inwardly-facing attachment surface 20b of the trim member 14.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An assembly comprising:
a substrate defining a finished surface and an unfinished surface;
a trim member defining an outwardly-facing finished surface and an inwardly-facing attachment surface, wherein the inwardly-facing attachment surface of the trim member is arranged over and trims the unfinished surface of the substrate, wherein the finished surface of the substrate and the outwardly-facing surface of the trim member form a cooperating finished surface; and
a heat-activated adhesive member having a first attachment surface and a second attachment surface, wherein the heat-activated adhesive member joins the unfinished surface of the substrate to the inwardly-facing surface of the trim member, wherein the heat-activated adhesive member transitions from an un-adhered state to an adhered state for joining the unfinished surface of the substrate to the inwardly-facing attachment surface of the trim member, wherein the un-adhered state of the heat-activated adhesive member respectively defines the first attachment surface and the second attachment surface of the heat-activated adhesive member to have:
an un-activated, non-tacky quality whereby the unfinished surface of the substrate is not attachable to the inwardly-facing surface of the trim member,
wherein the adhered state of the heat-activated adhesive member respectively defines the first attachment surface and the second attachment surface of the heat-activated adhesive member to have:
an activated, tacky quality whereby the unfinished surface of the substrate is attachable to the inwardly-facing surface of the trim member, wherein a removable member is removed from the second attachment surface of the heat-activated adhesive member after the heat-activated adhesive member transitions from the un-adhered state to the adhered state for joining the unfinished surface of the substrate to the inwardly-facing surface of the trim member.

2. The assembly of claim 1, wherein both of the finished surface of the substrate and the outwardly-facing finished surface of the trim member define an A-surface, wherein the unfinished surface of the substrate defines a B-surface, wherein the A-surface is a show surface having an aesthetically-pleasing appearance, wherein the B-surface is not a show surfacing having a non-aesthetically-pleasing appearance.

3. The assembly of claim 1, wherein at least one of the substrate and the trim member includes a leather material.

4. The assembly of claim 1, wherein at least one of the substrate and the trim member includes an artificial leather material.

5. The assembly of claim 1, wherein a height of the substrate ranges between approximately five-to-ten times a height of the trim member, wherein the height of the substrate ranges between approximately two-to-four times a width of the trim member, wherein the height of the substrate ranges between approximately two-to-four times a width of the adhesive member.

6. The assembly of claim 1, wherein both the substrate and the trim member include either one of a leather material or an artificial leather material.

7. The assembly of claim 1, wherein the removable member includes a film material.

8. The assembly of claim 1, wherein the removable member includes a paper material.

9. The assembly of claim 1, wherein the height of the substrate ranges between approximately two-to-four times a width of the substrate.

10. The assembly of claim 1, wherein the width of the trim member ranges between approximately two-to-four times the height of the trim member.

11. The assembly of claim 1, wherein the width of the heat-activated adhesive member ranges between approximately two-to-four times a height of the heat-activated adhesive member.

* * * * *